J. F. CHASE.
HARROW.
No. 175,852. Patented April 11, 1876.
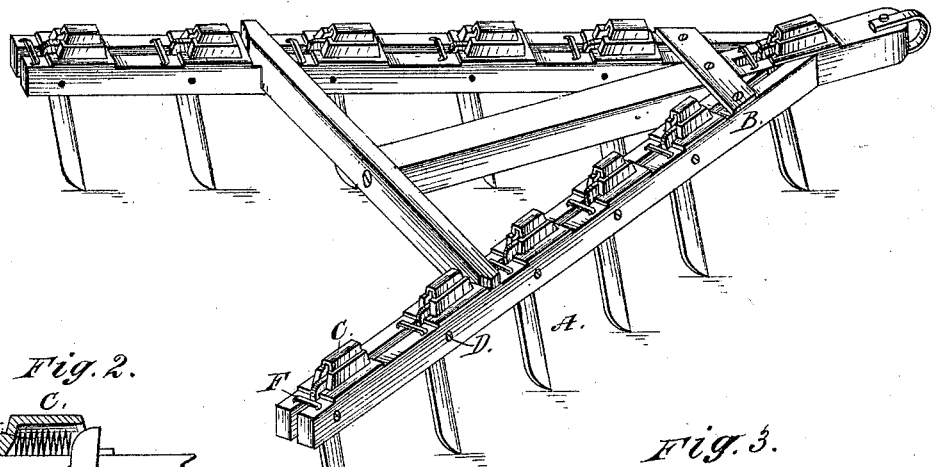
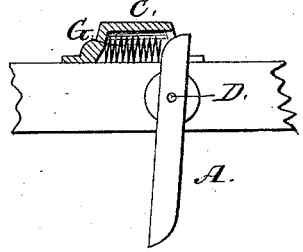
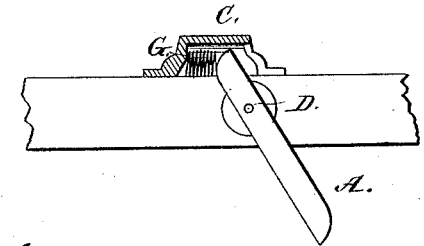
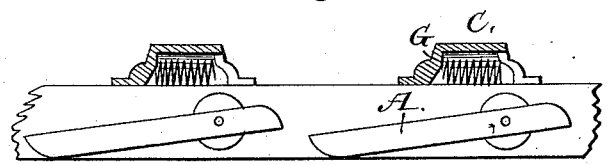
Witnesses:
Hiram Willey
Allen Willey
Inventor:
John Frank Chase

UNITED STATES PATENT OFFICE.

JOHN F. CHASE, OF EAST HADDAM, CONNECTICUT.

IMPROVEMENT IN HARROWS.

Specification forming part of Letters Patent No. 175,852, dated April 11, 1876; application filed March 24, 1876.

*To all whom it may concern:*

Be it known that I, JOHN FRANK CHASE, of the town of East Haddam, in the county of Middlesex and State of Connecticut, have invented a new and useful Improvement in Self-Adjusting Spring Harrow-Teeth; which improvement is fully set forth in the following specification, reference being had to the accompanying drawings:

Figure 1 represents the harrow complete. Letter A represents tooth in combination with frame B and cap C, cap C covering spring and tooth. The object of spring in cap C is to enable the tooth to spring back and clear itself from stones, roots, and other obstructions with which it may come in contact. The frame B is made in two parts, the tooth A is set between these parts, bolt D passing through the beams and through tooth A, holding said parts together, and upon which tooth A turns back when meeting obstructions, and also allowing the tooth A to be shut up between the parts of the frame B when not in use or when transported. Letter F represents an adjustable stop or guide for the tooth A behind the cap C. Fig. 2 represents one part of a section of the harrow with the tooth A in combination with spring G, cap C, and bolt D. Fig. 3 represents the tooth A in combination with the spring G and cap C in position in which it would be when meeting obstruction and passing over it. Fig. 4 represents the tooth A as it is shut up between parts of frame B.

What I claim as my invention, and desire to secure by Letters Patent, is—

The cap C, spring G, and pivoted-tooth A, in combination with the frame of the harrow B, as and for the purpose specified.

JOHN FRANK CHASE.

Witnesses:
J. BRAINERD,
D. P. COWL.